Figure 3:
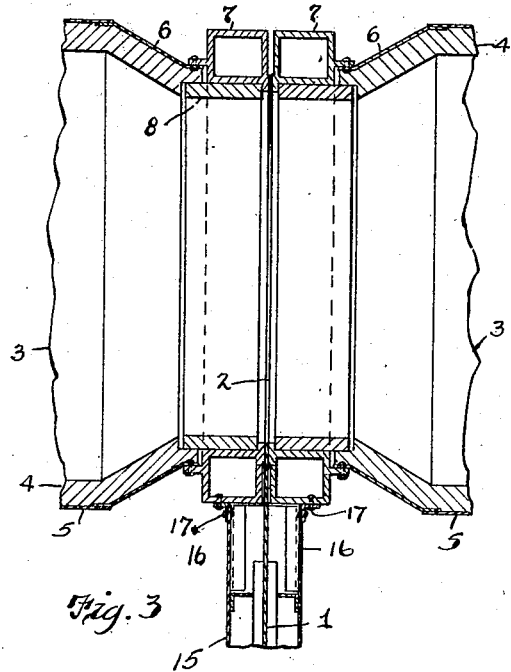

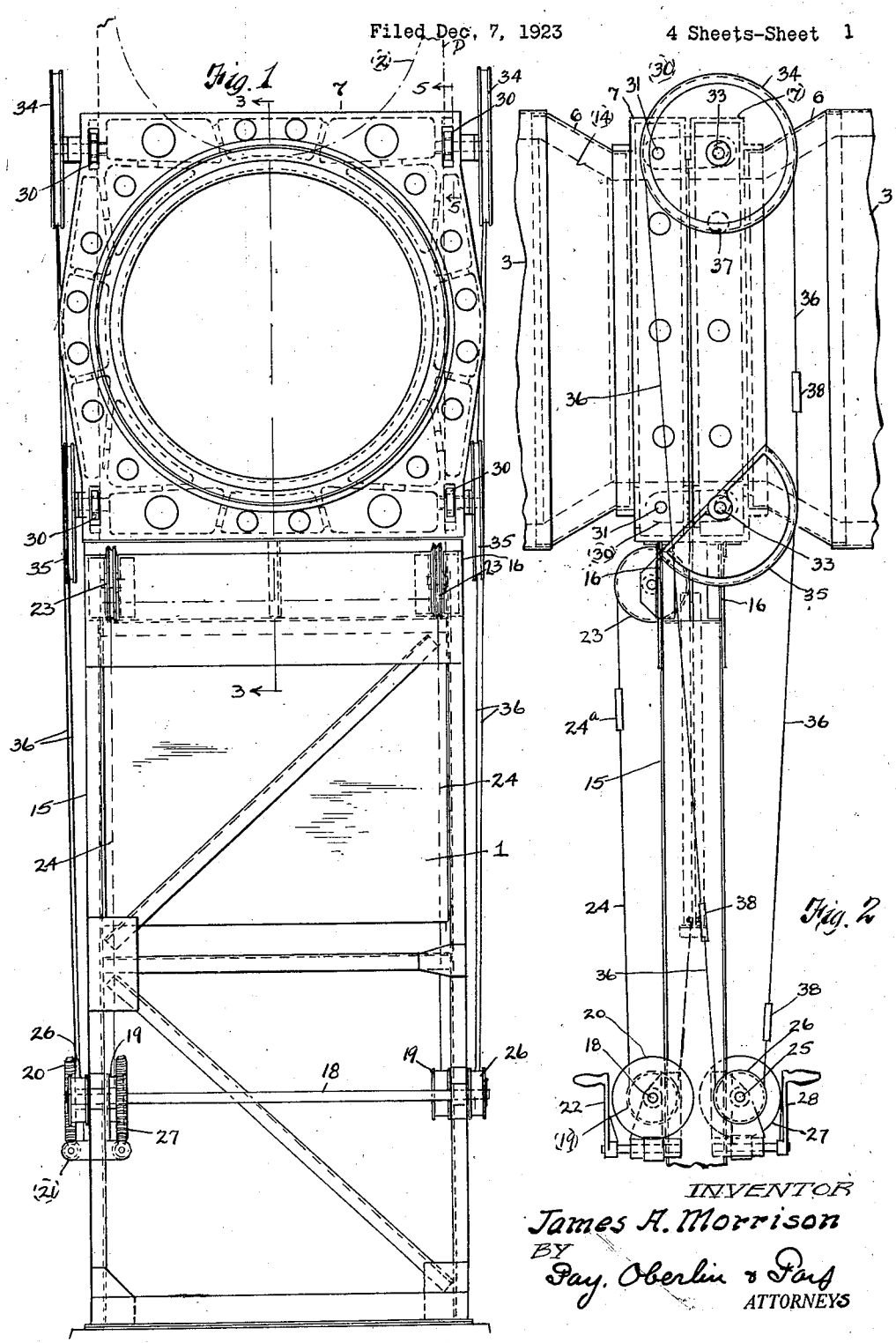

June 19, 1928.

J. A. MORRISON

GOGGLE VALVE

Filed Dec. 7, 1923

1,674,255

4 Sheets-Sheet 2

INVENTOR.

James A. Morrison.

BY

Fay, Oberlin & Fay

ATTORNEYS

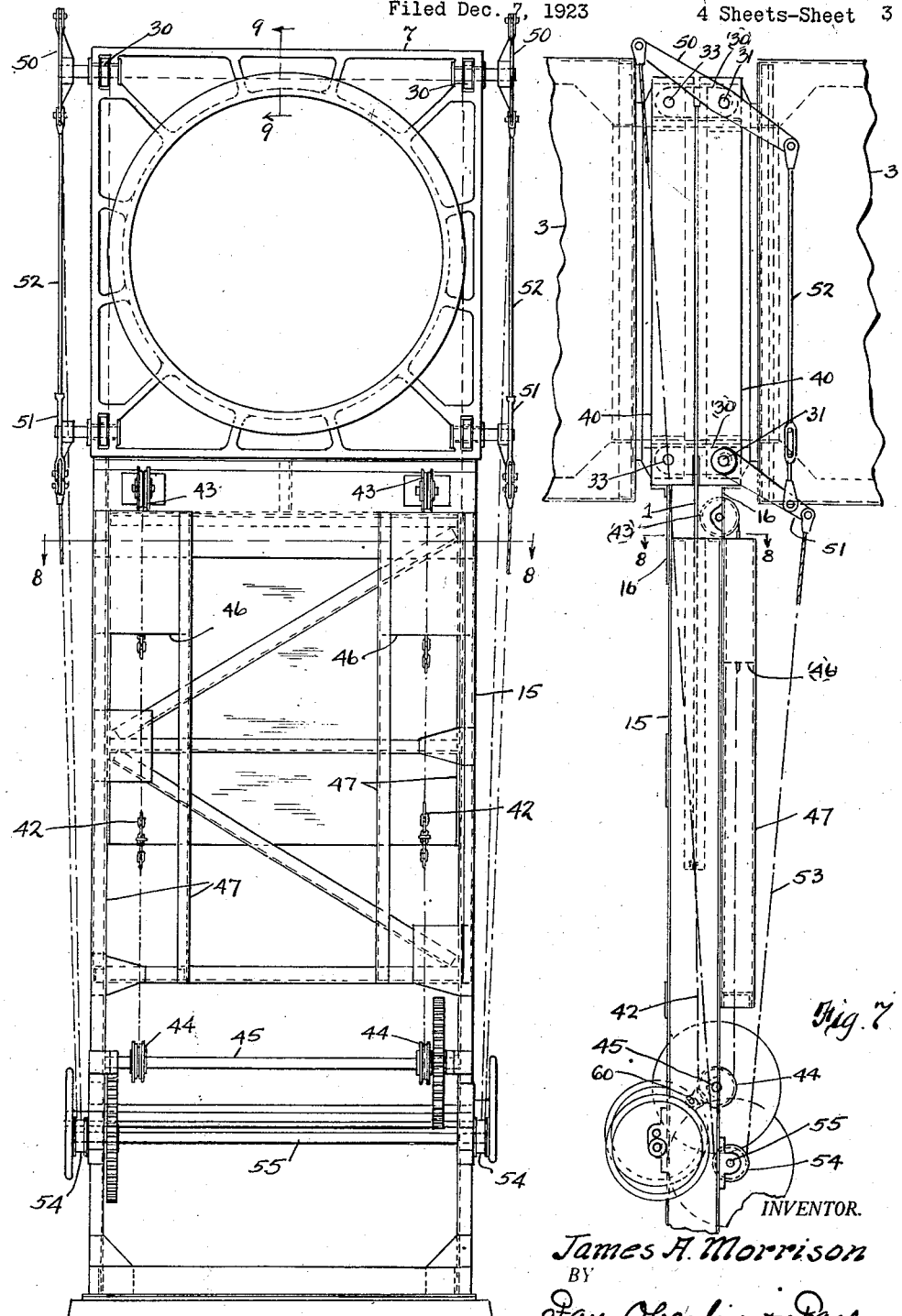

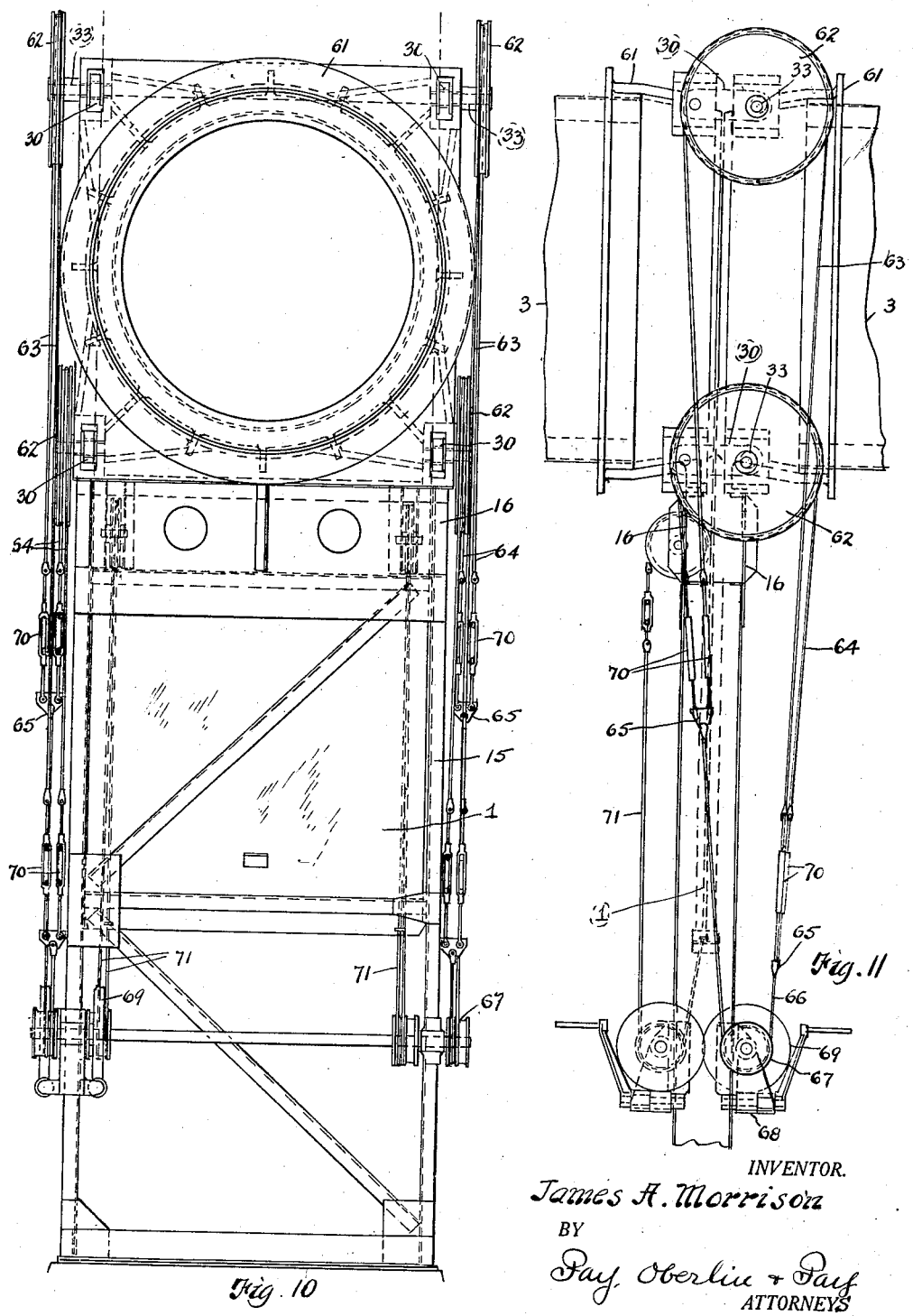

Patented June 19, 1928.

1,674,255

UNITED STATES PATENT OFFICE.

JAMES A. MORRISON, OF ROCKY RIVER VILLAGE, OHIO.

GOGGLE VALVE.

Application filed December 7, 1923. Serial No. 679,153.

It has been the practice in blast furnace operations to use, for shutting off the flow of blast furnace gas through gas mains, what is called a "goggle valve", which is nothing more or less than a plate inserted between two opposing ends of the pipe forming the main, one part of such plate being imperforate and the other having an opening approximately equal to the internal diameter of such pipe. When it is desired to shut the main, the bolts through the flanges, whereby such opposing pipe ends are normally secured together, are removed and the plate shifted to a position such that the solid portion thereof is interposed and the flow of gas thus shut off. The bolts are then replaced and the pipe thus maintained in closed position until it is desired to open it again, when the operation is repeated, except that the plate is shifted back to its normal position in which the opening therein is aligned with the opening in the main.

Despite a number of objectionable features, this type of valve is universally used in the connection stated for the reason that no ordinary type of gate valve is satisfactory. In the first place, such a valve would be extremely expensive and in the second place, the apertures in the valve between the seats would rapidly fill up with flue dust and when it was desired to close the gate, this would be found impossible. The ordinary gate valve is furthermore unsatisfactory for the reason that there is no way of telling whether it is absolutely tight or not and if any gas should leak through when the valve is supposed to be shut, it would pass along the main and would be extremely likely to gas and possibly kill any men who went into the pipe in fancied safety. In case of the goggle type valve, on the contrary, any leakage that occurs from the valve passes into the atmosphere and is not forced into the closed end of the pipe under any circumstances.

However, the standard construction of goggle valve, as described above, involves certain operative difficulties. There is of course always a tendency for the plate to stick after it has been clamped between the flanged ends of the pipe for some length of time due to accumulated flue dust, corrosion, etc., and the ends of the pipe require to be forcibly pried apart so as to free the plate. On the other hand, as soon as the bolts are removed, the pressure on the gas in the main causes it to leak out through any space that may occur between the plate and the delivery side of the main, and inasmuch as the main is usually up in the air with insufficient platform facilities, the operation of opening or closing a valve of this sort is extremely hazardous, resulting frequently in the gasing of the workmen and not infreqently causing them to fall from the pipe and be injured or killed.

One principal object of the present invention is to provide improved operating means for such a goggle valve which will permit the same to be shifted from one position to another from an operating station removed from the main and at a conveniently lower level in case the main is an elevated one as usual. Another object is to provide means for forcibly separating, as well as for forcibly clamping together, the opposed ends of the pipe forming the main so as more readily to permit such shifting movement of the valve proper. Still a further object is to provide a valve of the type in question with operating means, as aforesaid, which will be simple and sturdy in construction and adapted for incorporation in the gas mains found in existing plants.

To the accomplishment of the foregoing and related ends, the invention, then, consists of the means hereinafter fully described and particularly pointed out in the claims, the annexed drawings and the following description setting forth in detail certain mechanism embodying the invention, such disclosed means constituting, however, but one of various mechanical forms in which the principle of the invention may be used.

In said annexed drawings:—

Figure 4:
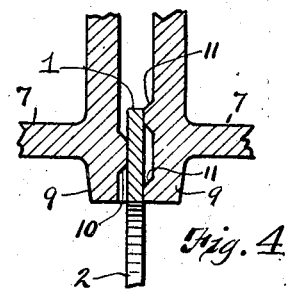
Figure 5:
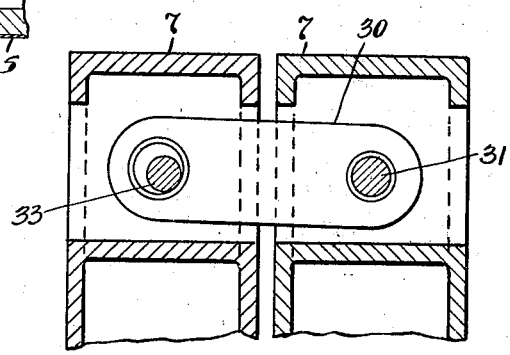
Figure 12:
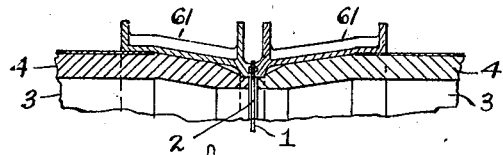
Figure 8:
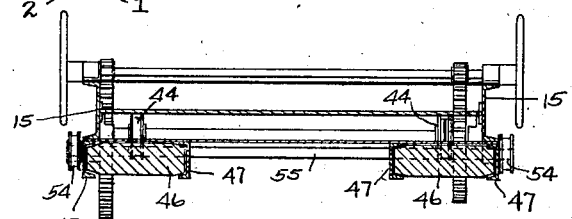
Figure 9:
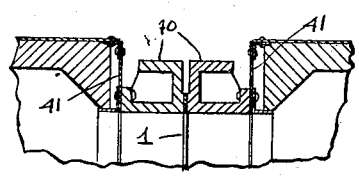

Fig. 1 is an end elevation of my improved goggle valve and operating mechanism associated therewith; Fig. 2 is a side elevation of the same; Fig. 3 is a vertical central section of the valve, as indicated by the line 3—3, Fig. 1; Fig. 4 is a sectional view of a detail of the valve seat taken on the same plane as Fig. 3 but on a larger scale; Fig. 5 is a sectional view of another detail on a larger scale, the plane of such section being indicated by the line 5—5, Fig. 1; Fig. 6 is an end elevation similar to that of Fig. 1, but showing a modification in construction; Fig. 7 is a side elevation of such modified construction; Fig. 8 is a transverse section thereof, taken on the plane indicated by the lines 8—8, Figs. 6 and 7; Fig. 9 is a central vertical section of such modified construction, the plane of such section being indicated by the line 9—9, Fig. 6; Fig. 10; is an end elevation; Fig. 11 is a side elevation of still another modified form of my invention; and Fig. 12 is a transverse section thereof, the plane of such section being indicated by the line 12—12, Fig. 11.

Referring first to the form of my improved valve, shown in Figs. 1 to 5, inclusive, it will be noted that such valve consists, as hereinbefore described, of a plate 1, the lower portion of which is solid or imperforate, while the upper portion is formed with a circular opening 2 of approximately the same diameter as the internal diameter of the main 3. It will be noted that in Figs. 1, 2 and 3, such plate 1 is shown in full lines in its lowermost position, i. e., with the opening 2 therein aligned with the opening in such main. In Fig. 1, however, the plate is shown in raised position in dotted outline, the opening 2 in such position lying entirely above the opening in the main, so that the imperforate portion of the plate will shut off such main.

The main is of usual construction, having a refractory lining 4 to protect the metal casing 5 from contact with the highly heated gases that are intended to be conveyed therethrough. The opposing ends 6 of such main, where the latter is split or interrupted to permit of the insertion of the valve 1, are tapered slightly inwardly so as somewhat to reduce the diameter of the main at this point and to such ends respectively are fixedly attached corresponding hollow or box-like frame 7 of general rectangular form, the juxtaposed faces of which contact directly with the opposite sides of the plate 1. An extension 8 of the refractory lining 4, it will be noted, is carried across the inner faces of the frames 7, such lining extension abutting against inwardly directed flanges 9 on the latter, as shown in Fig. 3.

In order to reduce the area of frictional contact between plate 1 and the frames 7, one of the latter may be provided with a circular rib 10 and the other with two radially spaced concentric ribs 11, so disposed as to lie on opposite sides of such first named rib, as shown in Fig. 4, when the ends 6 with the frames respectively carried thereby are properly aligned. The valve plate 1 accordingly contacts only with these three ribs on the juxtaposed faces of said frame and not only is such plate thus rendered more readily shiftable, due to the minimum area of its contact with the frames, but when the latter are forcibly clamped together, as will be presently described, a secure and tight fitting joint against both sides of the plate is obtained due to the disposition of the ribs 10 and 11.

The two frames 7, thus attached to the opposed ends 6 of the main or conduit 3, are supported on a tower 15 which is preferably an open frame structure, as shown in Fig. 1. As best shown in Figs. 2 and 3, the upper end of the tower comprises two relatively movable portions in the form of flexible extensions 16 upon which the open frames 7 directly rest and to which they are attached through the medium of angle bars 17. Said upper tower portions 16 require to have only a slight relative movement corresponding with that which it is necessary to impart to said frames in order to clamp the valve plate 1 therebetween or release such plate sufficiently to permit same to be shifted from one position to another, as hereinbefore described. The valve plate 1, it will be understood, is suitably guided in the tower structure 15, so far as this may be necessary, such plate of course even while being shifted being guided between the frames 7 on the meeting ends of the conduit 3.

For the purpose of thus shifting the valve plate, the following means are provided, viz:—Near the bottom of the tower structure that supports the gas main and the valve, and a considerable distance away from the latter, is located a transverse shaft 18 having drums 19 and a worm gear 20 and worm 21 with a crank 22 for manual operation. Wound around each drum 19 and thence passing around a sheave 23 in the upper portion of the tower is a wire rope or equivalent cable 24 that is in effect endless, having its ends secured to the lower end of the valve plate 1. A suitable turnbuckle 24ª is inserted in one portion of such cable to permit adjustment of its length when required. As a result of the foregoing construction, when crank 22 is turned to rotate said drums 19 in one direction, the valve plate will be raised, e. g. from the position shown in full lines to that shown in dotted outline in Fig. 1; while upon rotation of said crank and thus of the drums in the opposite direction, the plate is pulled downwardly into the normal position thus shown in full lines.

For the purpose of clamping the frames 7 together, or forcing them slightly apart to permit shifting of the valve plate 1, the following means are provided, viz:—There is likewise located in the lower portion of the tower a second transverse shaft 25, having drums 26 and a worm gear 27 with a crank 28 for manual operation, just as, in the case of said first named shaft 18. Located near each of the four corners of the respective frames 7 is a heavy link 30, shown in detail in Fig. 5, such link being pivoted to the one frame with a solid pin 31 and to the other frame with an eccentric pin or crank 33 that has a small throw only. On an extension of each such eccentric pin or shaft 33 is keyed a sheave, such sheave in the case of the upper pins being a complete circular sheave 34 and in the case of the lower pins being a segmental sheave 35, as shown in Fig. 2. Oscillation of the pins in one direction will obviously serve to draw the frames 7 toward each other, while oscillation of such pins in the opposite direction will conversely serve to force said frames slightly apart. Such oscillation is produced upon rotation of shaft 25 in one direction or the other through the medium of a wire rope or equivalent cable 36 that is wrapped several times around sheave 34, being attached thereto at the point 37. One end of this cable passes from said sheave 34 to the corresponding drum 26 around which it is passed several times and is thence carried to the segmental sheave 35 to which it is attached, the point of attachment being at the lower corner thereof in the position illustrated in Fig. 2; the other end of said cable after leaving sheave 34 is carried directly to said segmental sheave 35, being attached thereto at a point substantially diametrically opposite from the point to which the first mentioned end is attached, i. e. at the upper corner thereof, as shown in said Fig. 2. Turnbuckles 38 are inserted in the several portions of the cable 36 to permit adjustment of the length of such portions as may be required.

By reason of the aforedescribed cable connections between the drums 26 and sheaves 34 and 35, it will be seen that rotation of crank 28 in one direction or the other will serve simultaneously to rotate all four of the eccentric pins 33 and thus to draw the frames 7 together at all four corners or to force the same apart, depending upon the direction of oscillation of said eccentric pins. As previously explained, only a slight movement of the frames is necessary; indeed these being fixedly attached to the ends of the conduit 3, only a very slight movement thereof is possible, equivalent to that heretofore obtained by forcibly prying the ends of the conduit apart. Due, however, to the tremendous stress that is obtained by the use of the worm and worm gear, acting through the leverage afforded by the sheaves 34 and 35 on the small radius eccentrics of the pins 33, it is possible for the operator, without over-exertion, to apply an enormous pressure against the ends of the pipe to force them apart and release the goggle-plate.

Similarly the worm and gear arrangement for raising and lowering the goggle plate gives the operator a tremendous leverage so that he can readily force such plate either up or down in spite of the fact that it may be coated with flue dust or even slightly warped and so very much inclined to resist the desired movement. When the plate is again clamped together by the worm gear and eccentric mechanism, the same leverage is of course available for clamping the ends of the pipe against such plate as for separating such ends to release the plate. There will accordingly be no difficulty in so tightly forcing the valve seats 10 and 11 on the juxtaposed faces of the frames 7 against the plate under such pressure as to prevent any possibility of leakage, even though the gas may be at a very considerable pressure and despite the fact that there may be some accumulation of dirt on the goggle plate surfaces.

In the modified construction shown in Figs. 6 to 9, inclusive, the general arrangement of parts is substantially the same as in the first described form of my improved goggle valve. However, in such modified construction, instead of sliding the valve plate 1 between two frames fixedly attached to the opposed ends of the conduit 3, I employ corresponding frames 40 that are shiftably attached to such conduit ends, respectively, through the medium of annular diaphragms 41, as best shown in Fig. 9, the flexible extensions 16 constituting the general support of the structures, as more fully shown in Fig. 7. In this construction, accordingly, the frames 40 may be forced apart or brought together to clamp the valve plate therebetween with the exertion of much less force, it being merely necessary to flex the flexible support extensions 16, or the diaphragms or annular plates 41 or both, as involved in the yielding necessary.

For raising and lowering the valve plate 1, I employ, as before, two cables 42, shown as consisting of chains, each of which passes around a sheave 43 in the upper end of the tower and around a chain wheel 44, mounted on a transverse shaft 45 near the bottom of such tower. Such chain is in effect endless, being attached at one point to the lower end of the valve plate and including a counterweight 46 on the opposite side of sheaves 43, such counterweight being held between suitable guides 47 and serving to balance the weight of the plate.

Links 30 are located in each of the four corners of the frames 40 just as in the case of the previously described frames 7, but the eccentric pins 33 are operated by means of double levers 50, in the case of the two upper pins, and single levers 51 in the case of the two lower pins, as shown in Fig. 7. Lever 51 is connected with the corresponding arm of lever 50 by means of a rod 52, while a cable 53 that passes around a drum 54, mounted on a transverse shaft 55 located just below shaft 45, has one end connected to said lever 51 and its other end connected to the opposite arm of said lever 50. Rotation of shaft 55 in one direction or the other will accordingly produce corresponding rotative movement of all four of the eccentric pins 33, whereby the several links 30 are actuated to draw the frames 40 together or force the same apart For operating the shafts 45 and 55, two hand wheels 56 and 57 are provided, these being connected through the medium of spur gearing 58 and 59 with said shafts, respectively. In the case of the gearing thus provided for raising and lowering the valve plate, a pawl 60 is desirably utilized to lock such gearing and thus the shaft 44 against rotation when the plate has been shifted to desired position.

It will be understood that this second form of mechanism for raising and lowering the goggle valve may be employed in the first described form of my invention and that conversely the mechanism of such first form may be interchangeably used with frames such as frames 40, flexibly or otherwise movably mounted on the opposed ends of the gas main 3.

The remark just made applies equally to the modified form of operating mechanism shown in Figs. 10 and 11, in which figures I furthermore illustrate a modification in the form of the two frames 61 that here constitute the opposed ends of the conduit 3 or, in other words, the seat members that cooperate with the goggle valve 1. As best shown in Fig. 12, said frames 61, instead of being of box-like form and of smaller internal diameter than the conduit, are approximately annular and necessitate only a very slight contraction in the diameter of the duct or conduit at the point where the valve is interposed.

Links 30 are employed as in the two preceding forms for forcing the frames or valve seat members 61 apart and for forcibly clamping the same together, the eccentric pin 33 on each such link having fixedly mounted on its outwardly directed end a sheave 62. A cable 63 is passed around each of the two uppermost sheaves 62 and a cable 64 around each of the lowermost sheaves, the ends of the two cables on each side being in turn connected through the medium of equalizers 65 with the corresponding ends of a third cable 66 that is wound around an operating drum 67. The latter may be rotated in either direction as desired through the medium of a worm 68 and worm gear 69, as need not be described in detail. Turnbuckles 70 are interposed in cables 63 and 64 whereby the length thereof may be independently adjusted.

For the purpose of raising and lowering the plate 1 that constitutes the goggle valve, still another cable 71 is provided, the arrangement of this cable being substantially the same as that of cable 24 in the first described construction (see Figs. 1 and 2).

It will be noted that in each of the three modified constructions hereinbefore described, the links 30 in combination with eccentric pins 33 constitute in effect toggle connections for forcing the ends of the pipe or conduit 3 apart and for clamping them forcibly against the plate or goggle valve, as occasion may require. The throw of the eccentric pins is of course very slight and as has already been made plain, tremendous pressure may be exerted due to the toggle action obtained, quite aside from the leverage afforded by the radius of the sheaves or links through which power is applied to said eccentric pins and quite aside from the further multiplication of power secured by the worm and worm gear operating mechanism for the winding drums for the respective cables leading to such sheaves or links.

It will further be noted that by means of the operating mechanism thus provided, the movement of all the eccentric pins is synchronized and the frames or valve seat members that form ends of the conduit 3 are thus at all times maintained in parallelism. Movement of such frames or seat members, in other words, is strictly in the line of the axis of the conduit, this being rendered possible by the unique manner adopted for supporting such frames or members on the tower 15 or equivalent supporting structure.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In a valve of the character described, the combination of opposed seat members forming the ends of two portions of a pipe, a goggle plate shiftable between said members; and means adapted to force said members apart or clamp the same against said plate as desired, said means including a plurality of links individually connecting said members, a rotatable eccentric pin securing one end of each of said links to the corresponding member, and means for rocking said eccentric pins.

2. In a valve of the character described, the combination of opposed seat members forming the ends of two portions of a pipe, a goggle plate shiftable between said members; and means adapted to force said members apart or clamp the same against said plate as desired, said means including a plurality of links individually connecting said members, a rotatable eccentric pin securing one end of each of said links to the corresponding member, and means adapted simultaneously to rock all of said pins.

3. In a valve of the character described, the combination of opposed seat members forming the ends of two portions of a pipe, a goggle plate shiftable between said members; and means adapted to force said members apart or clamp the same against said plate as desired, said means including a plurality of links connecting said members, an eccentric pin for one end of each of said links, a sheave fixedly mounted on each of said pins, winding drums, and cables connecting the latter with said sheaves, whereby said pins may be simultaneously rocked.

4. In a valve of the character described, the combination of opposed seat members attached to and forming the juxtaposed ends of two aligned pipe portions, and means independent of said pipe for supporting said members and permitting movement axially with such pipe portions.

5. In a valve of the character described, the combination of opposed seat members attached to and forming the juxtaposed ends of two coaxial pipe portions, and means for supporting such pipe portions and holding them in axial relation to each other but permitting limited movement with the pipes in an axial direction.

6. In a valve of the character described, the combination of opposed seat members at the ends of two aligned pipe portions, a goggle plate slidable between said members, means including flexible elements for supporting said members and permitting a limited range of axial movement for such members together with their respective pipe portions.

7. In a valve of the character described, the combination of opposed seat members at the ends of two aligned pipe portions, a goggle plate slidable between said members, and a support for said members, said support including a frame independent of said pipe portions, and flexible extensions between said frame and said members permitting a limited range of axial movement for the members together with their respective pipe portions.

8. In the valve of the character described, the combination of opposed seat members forming the juxtaposed ends of two aligned pipe portions, means independent of said pipe movably supporting said members, said means being adapted to limit movement thereof to a direction aligned with the axis of such pipe, and connections including links and eccentric pins therefor adapted to force said members apart or clamp the same against said plates as desired.

9. In a valve of the character described, the combination of two opposed seat members in the form of approximately rectangular frames having openings aligned with a main to be controlled; an apertured plate bodily shiftable between said members to open and close such main; and means adapted to draw said members together or force the same apart as desired, said means including a plurality of links connecting said members, one located near each of the four corners of said members, an eccentric pin for one end of each of said links, a sheave fixedly mounted on each of said pins, two winding drums, and cables passing around each of said drums and thence around the upper of a corresponding pair of sheaves, said cables being attached to said sheaves, one end thereof passing thence to the lower of such pair of sheaves, and the other end of the said cables extending from said drum to said lower sheave and being attached thereto at a point opposite such first cable-end.

10. In a valve of the character described, the combination of opposed seat members having openings aligned with the main to be controlled, an apertured plate bodily shiftable between said members to open and close such main; means adapted to draw said members together or force the same apart as desired, said means including a plurality of links individually connecting said members, a rotatable eccentric pin securing one end of each of said links to the corresponding member, and means for rocking said eccentric pins; and means adapted to shift said plate, said means including a winding drum removed from said members, a sheave located adjacent the same, and a cable passing around said drum and sheave and attached to the corresponding end of said plate.

11. In a valve of the character described, the combination of two opposed seat members having openings aligned with the main to be controlled, at least one of said members being movable relatively to the corresponding end of said main; an apertured plate bodily shiftable between said members to open and close such main; and means adapted to draw said members together or force the same apart as desired, said means including a plurality of links individually connecting said members, a rotatable eccentric pin securing one end of each of said links to the corresponding member, and means for locking said eccentric pins.

Signed by me this 6th day of December, 1923.

JAMES A. MORRISON.